(12) United States Patent
Malasky

(10) Patent No.: US 7,734,914 B1
(45) Date of Patent: Jun. 8, 2010

(54) SYSTEM AND METHOD FOR ALLOWING APPLICATIONS TO SECURELY ACCESS FILES

(75) Inventor: Ethan Malasky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1267 days.

(21) Appl. No.: 11/219,235

(22) Filed: Sep. 2, 2005

(51) Int. Cl.
*H04L 29/06* (2006.01)
(52) U.S. Cl. ...................................... 713/165; 713/167
(58) Field of Classification Search ......... 713/152–157, 713/164–167
See application file for complete search history.

(56) References Cited

U.S. PATENT DOCUMENTS

| | | | |
|---|---|---|---|
| 6,687,745 | B1 | 2/2004 | Franco et al. |
| 6,766,314 | B2* | 7/2004 | Burnett ........................... 707/2 |
| 2003/0236850 | A1* | 12/2003 | Kodama ..................... 709/214 |
| 2005/0120242 | A1* | 6/2005 | Mayer et al. ................. 713/201 |

OTHER PUBLICATIONS

Free On-Line Dictionary Of Computing, 1997, http://foldoc.org/pathname and http://foldoc.org/basename.*
Berners-Lee, et al. "Uniform Resource Locators (URL)", Dec. 1994, retrieved from the internet at http://www.ietf.org/rfc/rfc1738.txt, on Jul. 11, 2006, 21 pages.
Berners-Lee, "Universal Resource Identifiers in WWW", Jun. 1994, retrieved from the internet at http://www.ietf.org/rfc/rfc1630.txt, on Aug. 20, 2006, 27 pages.
Brown, "Security Briefs: Strong Names and Security in the .NET Framework" Dec., 2003 retrieved from the internet at http://msdn.microsoft.com/library/default.asp?url=/library/en-us/dnnetsec/html/strongNames.asp?_r=1, on Jul. 11, 2006, 8 pages.
Daniel, "A Trivial Convention for using HTTP in URN Resolution", Jun. 1997, retrieved from the internet at http://www.ietf.org/rfc/rfc2169.txt, on Aug. 20, 2006, 9 pages.
Microsoft Corporation "IsolatedStorageContainment Enumeration", 2006 retrieved from the internet at http://msdn2.microsoft.com/en-us/library/system.security.permissions.isolatedstoragecontainment.aspx, on Aug. 25, 2006, 5 pages.
Moats, "URN Syntax", May 1997, retrieved from the internet at http://www.ietf.org/rfc/rfc2141.txt, on Aug. 20, 2006, 8 pages.
Moore, "WebDAV Protocol Comes of Age", Oct. 12, 2001, retrieved from the internet at http://www.infoworld.com/articles/fe/xml/01/10/15/011015feede, on Aug. 25, 2006, 6 pages.
Open Services Gateway Initiative, "OSGi Service Platform, Release 3", Mar. 2003, 602 pages.
Seda "Strong Names Explained—The Code Project—.NET", Nov. 25, 2004 retrieved from the internet at http://www.codeproject.com/dotnet/StroneNameExplained.asp, on Aug. 4, 2006, 12 pages.
Sun Microsystems Inc. "Security Features Overview", retrieved from the internet at http://java.sun.com/docs/books/tutorial/security/overview/index.html, on Aug. 3, 2006, 7 pages.
Wikipedia.org, "Runtime", retrieved from the internet at http://en.wikipedia.org/wiki/Runtime, on Aug. 25, 2006, 2 pages.

* cited by examiner

*Primary Examiner*—Nasser Moazzami
*Assistant Examiner*—Trong Nguyen
(74) *Attorney, Agent, or Firm*—Fish & Richardson P.C.

(57) ABSTRACT

A system and method which receives from an application a request to open a file for reading or writing, prompts the user for the file, and then provides a handle or alternate handle to the requesting application, but does not provide the name and path of the file and may not provide the actual handle to the file.

23 Claims, 4 Drawing Sheets

SYSTEM AND METHOD FOR ALLOWING APPLICATIONS TO SECURELY ACCESS FILES

FIELD OF THE INVENTION

The present invention is related to computer software and more specifically to computer software for accessing files in a secure manner.

BACKGROUND OF THE INVENTION

When a user instructs an application program where to store a file, or from where a file can be retrieved, the user exposes himself or herself to a security risk, in that the location of the file can be used by the application, or another application in communication with the application, to later access the file. What is needed is a system and method that can allow an application to store or retrieve a file without allowing the application to know where the file is actually stored.

SUMMARY OF INVENTION

A system and method allows an application program to request, via a set of APIs, that a file be retrieved or stored. All requests are made to an environment in which the application runs, and the environment prompts the user for the local filename and path, for example, via a conventional file open or file save dialog box (the file save dialog box can allow the user to enter a filename and optionally a path, that does not yet exist or to select a filename). The environment then opens that file or otherwise causes the file to be opened and provides a handle to the file to the application that made the request, but does not provide the name and path of the file. The environment has access to the information in the file, but not its name or path.

DETAILED DESCRIPTION OF A PREFERRED EMBODIMENT

Figure 1:
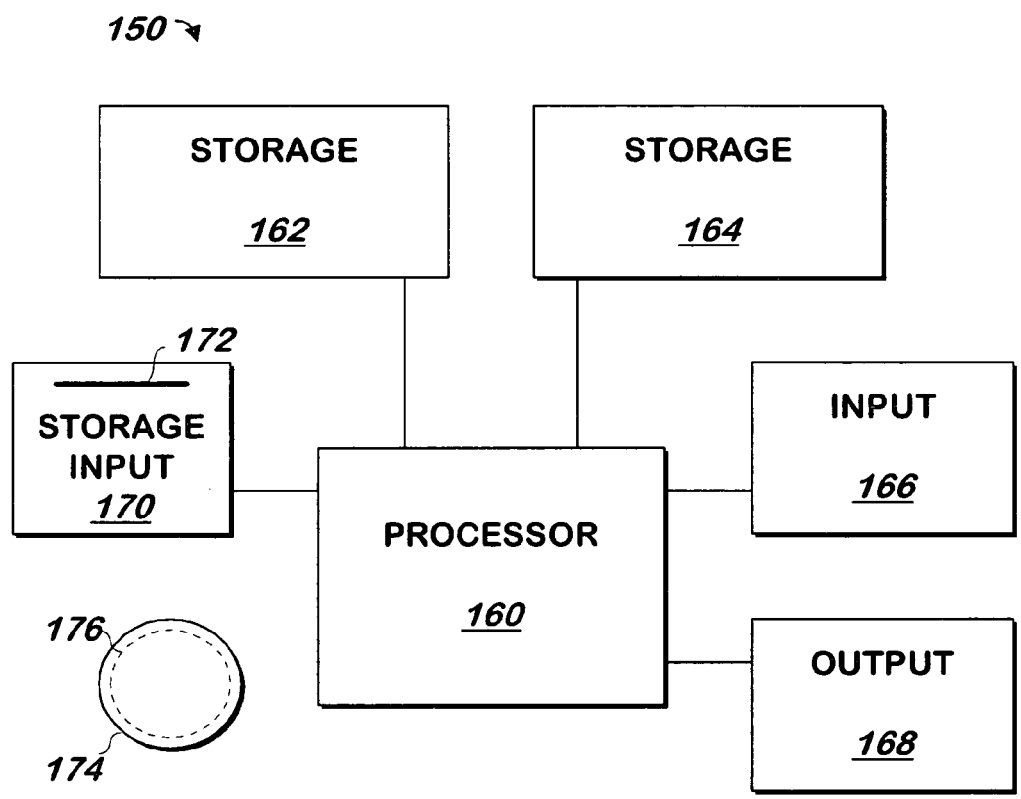
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
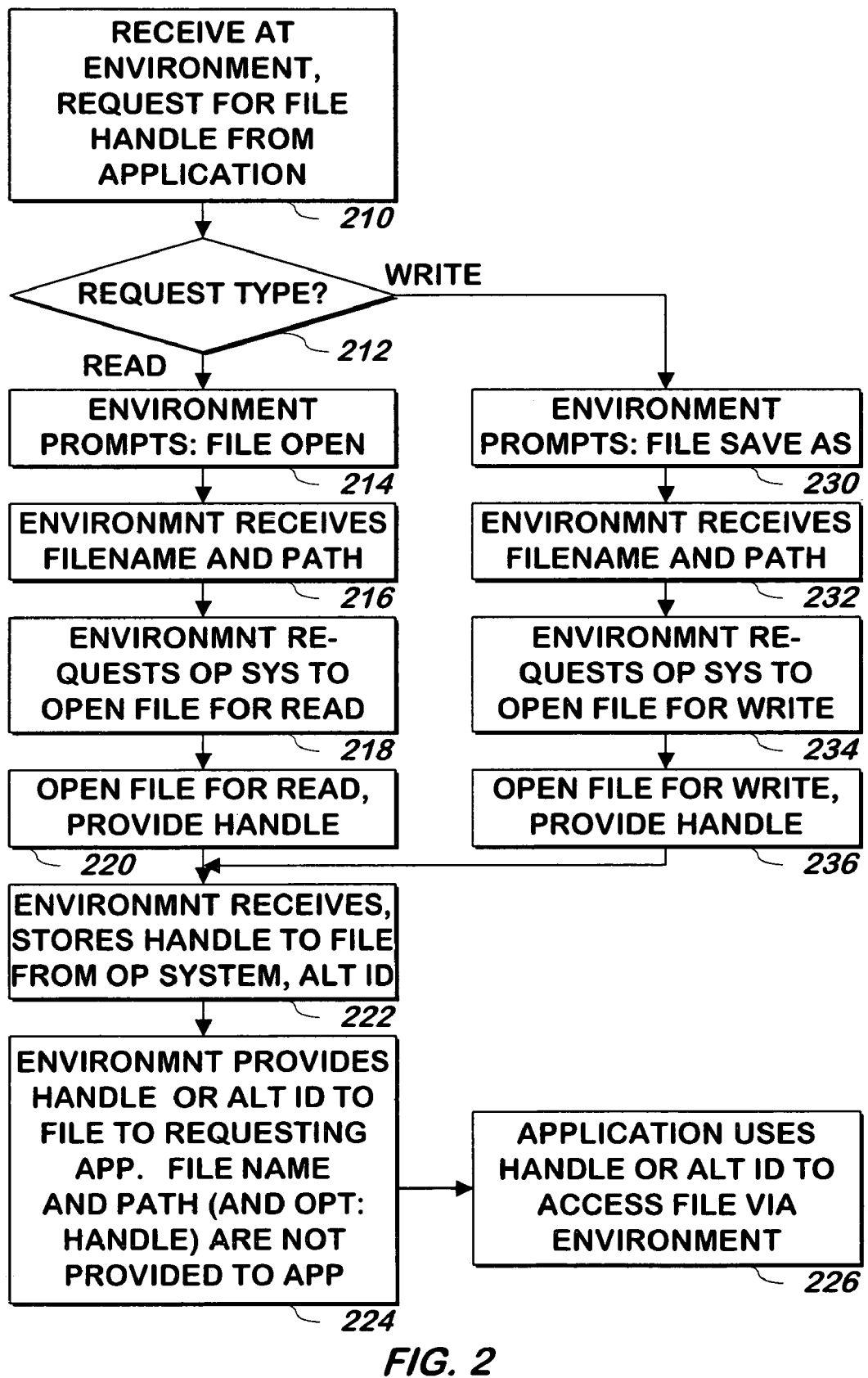
FIG. 2 is a flowchart illustrating a method of providing access to a file in a secure manner according to one embodiment of the present invention.

Referring now to FIG. 2, a method of providing access to a file in a secure manner is shown according to one embodiment of the present invention. A request for a file handle is received 210 at an environment in which different applications can run, the request having been provided by one such application. The environment is any computer software that can execute different applications, such as different applications written by different commercial entities. In one embodiment, the environment is an operating system that executes applications, and in another embodiment, the environment is another type of computer program that executes applications, such as the conventional Flash Player plug-in to conventional browsers.

The request for a handle to a file may be a part of a request to read a file or a request to write a file. If the request is a request to read a file 212, the environment prompts 214 the user via a display to select or provide a file name and path for an existing file (which may also include reading the file). In one embodiment, step 214 is performed by providing to the user a conventional "file open" dialog box that allows the user to select a file name and path using a graphical user interface. In one embodiment, such a prompt or dialog box is not available to be used directly by the application that sent the request in step 210. This prohibition may be enforced by the environment.

The environment receives 216 from a user an indication of the name and path of the file to be read, via the file open dialog box or via a text box, for example, and the environment requests 218 a different program, such as the operating system, or another portion of the environment, to open the indicated file for reading. The operating system, other portion of the environment or other program, opens the file for reading and provides a handle to the file to the environment 220 and the environment receives 222 the handle from the operating system or other portion of the environment or another program.

The environment optionally stores the handle associated with an alternate handle of the file and an identifier of the application if such alternate handle and identifier of the application is not already stored, and provides 224 either the handle but not the name and path; or the alternate handle of the file, but not the handle, name or path; to the application from which the request was received in step 224. In the embodiment in which the handle to the file is provided, the application may then access 226, the file, for example, to upload it to a server. The application may access the file via the operating system or via the environment.

In the embodiment in which the alternate handle is used, the application may access the file using the environment, which then acts as an intermediary between the application and the operating system to receive requests, convert the alternate handle to the handle used by the operating system, send the request to the operating system, receive any result and provide the result to the application with the alternate handle, preventing the application from having the handle to the file that it could use to access the file or its name via the operating system. The environment may allow or reject accesses that the application might not have permission to perform, for example, retrieving a file that had been downloaded from one domain that is different from the domain from which the application was downloaded, and for which the user has not otherwise provided permission after notification by the operating system. The details of the method of this embodiment are described below, with reference to FIG. 4.

If the request received in step 210 was part of a file write command 212, the environment prompts 230 the user via a display to select an existing or new file name and path for the file or specify the name and path of a new file. In one embodiment, step 230 is performed by providing to the user a conventional file "save as" dialog box that allows the user to select or provide a file name and path using a graphical user interface. In one embodiment, such a prompt or dialog box is not available to be used directly by the application that sent the request in step 210. This prohibition may be enforced by the environment.

The environment receives 232 an indication of the name and path of the file to be written, via the file open dialog box or via a text box, for example, and the environment requests 234 a different program, such as the operating system, or another portion of the environment, to open the indicated file for writing. The operating system, other portion of the environment or other program, opens the file for writing and provides a handle to the file to the environment 236 and the environment receives 222 the handle from the operating system or other portion of the environment or another program.

The environment provides 224 the handle of the file, but not the name or path, to the application from which the request was received in step 224. As noted above, in one embodiment, step 224 includes storing the handle, an alternate handle, and optionally an identifier of the application, associated with one another in a list of such information, and providing the alternate handle to the requesting application.

In one embodiment, the handle received by the application may be used 226 by the application to access the file, for example to reset the file, download a new file, or write additional information to it via the operating system or the environment. At no time during any file access or any other time does the application receive any information about the location of the file, such as its file name or path. In another embodiment, even the handle is not provided, and the application accesses the file via the environment using the alternate handle.

Figures 4, 5:
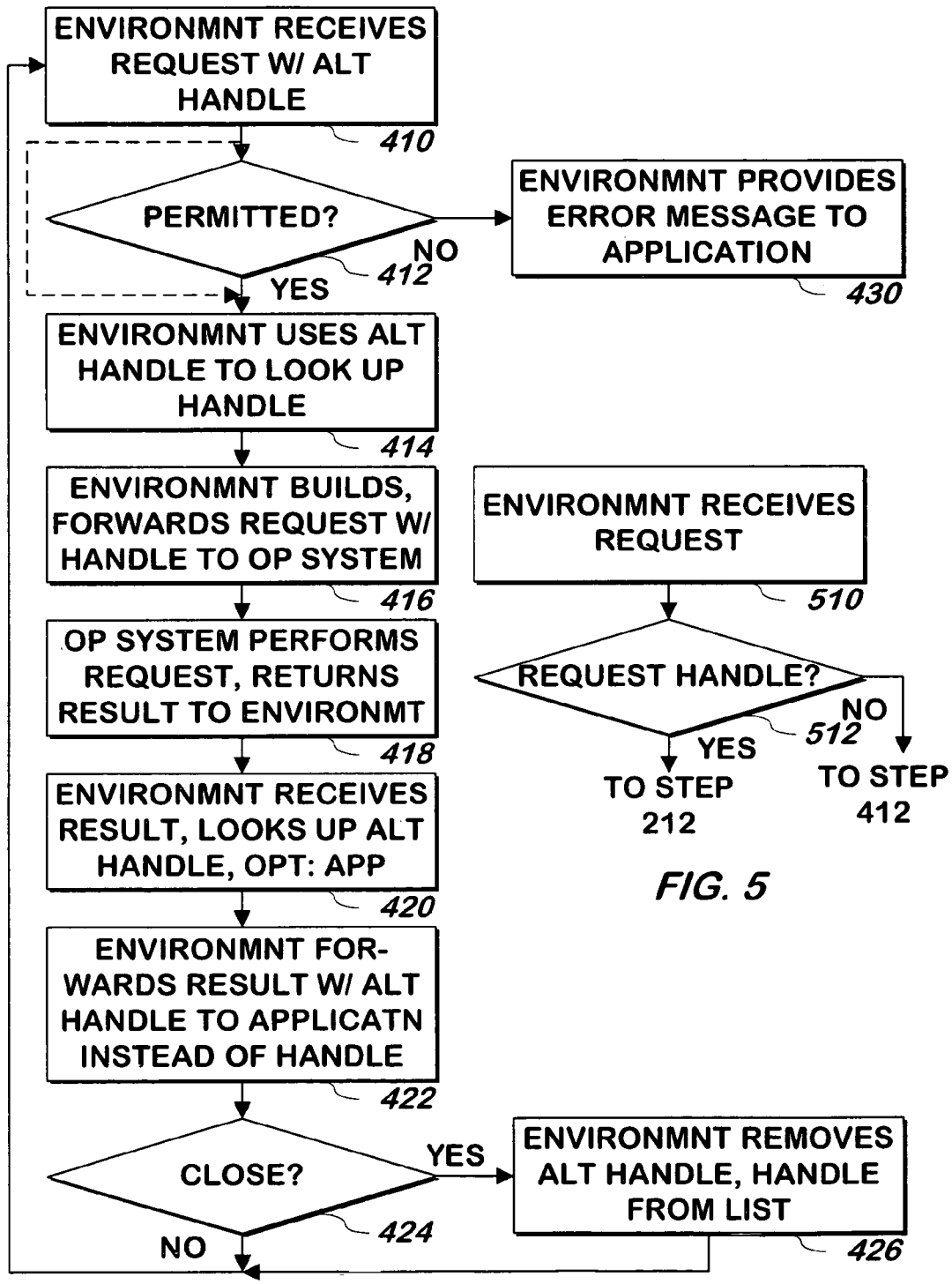
FIG. 4 is a flowchart illustrating a method of accessing a file using an alternate handle according to one embodiment of the present invention.
FIG. 5 is a flowchart illustrating the intake processing of a file access request according to one embodiment of the present invention.

FIG. 4 is a flowchart illustrating a method of accessing the file after the alternate handle is provided to the application in place of the handle as was briefly described above. Referring momentarily to FIG. 4, an environment such as Macromedia Flash or another environment under which an application may be run receives 410 from such an application program a request, such as a conventional read or write request, for a file containing an alternate handle. If fulfillment of the request is permitted 412, the environment looks up 414 the operating system handle corresponding to the alternate handle received, associated with one another as described above. The environment then builds a request corresponding to the request received, for example, requesting the same or similar action as described by the received request, but using the operating system handle looked up in step 412, and forwards the request to the operating system 416.

The operating system performs the request and provides the result to the environment along with the handle to the file, or another handle, that the operating system uses to reference the file 418. The environment uses the handle to identify 420 the alternate handle using the associations of alternate handles to handles built as described above and, optionally to identify the application to which the response should be provided using the association of applications to handles stored as described above. In another embodiment, the application is identified through other conventional means. The environment then forwards 422 any response to the application identified as described above, or, if the response allows the application to be inherently identified, for example, because only one such application may exist or may have an outstanding request at a time, the response is provided to such application. If the request or the response indicates that the file will no longer be used, for example, because the request was a close command and the response indicates the file is closed 424, the entry containing the handle, alternate handle and optionally application identifier is removed from the list of such entries 426 and the method continues at step 410 and otherwise 424, the method continues at step 410.

As noted above, the environment may optionally determine whether the request is permitted by the application that sent it. If such request is not allowed 412, an error message may be provided to the application that sent the request 430 and the method continues at step 430. In other embodiments indicated by the dashed line in the Figure, step 412 is omitted and step 414 follows step 410.

The processing of the requests for file access may be performed using the intake processing steps of FIG. 5. Referring now to FIG. 5, a request is received by the environment from an application 510. If the request is a request that would initially provide a handle to a file, such as an open command or one for which no alternate handle is received 512, the method continues at step 212 (step 210 receives the request, but this step is performed as part of step 510) and otherwise 512, the method continues at step 412 (step 410 receives the request, but this step is performed as part of step 410).

Figure 3:
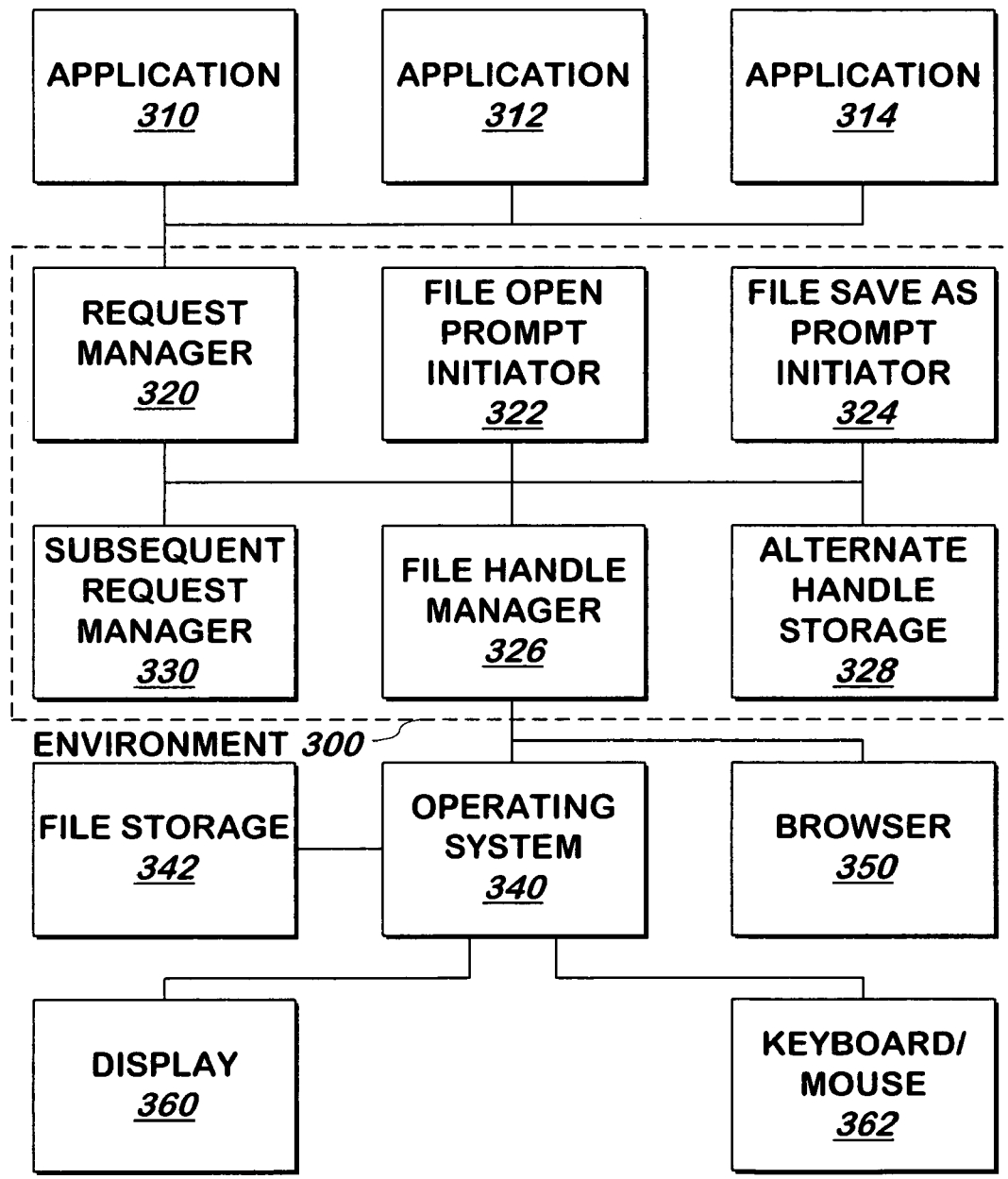
FIG. 3 is a block schematic diagram of a system for providing access to a file in a secure manner according to one embodiment of the present invention.

Referring now to FIG. 3, a system for providing access to a file in a secure manner is shown according to one embodiment of the present invention. The system of FIG. 3 may perform the method of FIGS. 2, 4 and 5.

Applications 310-314 are conventional applications that operate under the environment 300. In one embodiment, environment 300 runs under an operating system 340, or as a plug in to a browser 350 that runs under operating system 340, though in other embodiments, the environment 300 is part of the operating system 340. In one embodiment, applications 310-314 are each supplied by different entities, which are different from the entity supplying environment 300. In one embodiment, applications 310-314 can only request access to files or access to file handles via environment 300.

To obtain access to a file, an application 310-314 sends a request to open a file for read or for write to request manager 320. If the request is a request to open a file for read access, request manager 320 signals file open prompt initiator 322. If the request is a request to open a file for write access, request manager 320 signals file save as prompt initiator 324.

When signaled, in one embodiment, file open prompt initiator 322 builds a command that can cause operating system 340 to request a file name and path from the user via a conventional file open dialog box and provides the command to file handle manager 326. File manager 326 provides the command it receives to operating system 340. In another embodiment, file open prompt initiator 322 itself builds the user interface that will prompt the user and sends the prompt to file handle manager 326, which provides it to operating system 340. Operating system 340 either generates the user interface in response to the command or provides the user interface received to the user via display 360. The user uses keyboard/mouse 362, which is a conventional keyboard and a conventional mouse or other pointing or input device to specify the name and path of the file using conventional methods.

If the operating system 340 opens the file in response to the command, it provides a handle to the file that it opens to file handle manager 326. File handle manager 326 provides it to request manager 320, which provides it to the requesting application 310-314. If the operating system 340 provides the name and path of the file in response to the user so specifying it, the name and path specified by the user is received by file handle manager 326. In such embodiment, file open prompt initiator 322 also provides to file handle manager 326 an indication that the file is being opened for reading when it sends the command as described above. In response to the name and path, and because of the indication, file handle manager 326 builds a command to open the file for read access having the name and path it receives, and sends the command to operating system 340. Operating system 340 opens the file for read access in file storage 342, which may be conventional memory or disc storage, provides the handle to file handle manager 326, which provides it to request manager 320, which forwards it to the requesting application 310-314.

If the request is a request to open a file for write access, request manager 320 signals file save as prompt initiator 324.

When signaled, in one embodiment, file save as prompt initiator 324 builds a command that can cause operating system 340 to request a file name and path from the user via a conventional file save as dialog box and provides the command to file handle manager 326. File manager 326 provides the command it receives to operating system 340. In another embodiment, file save as prompt initiator 324 itself builds the user interface that will prompt the user and sends the prompt to file handle manager 326, which provides it to operating system 340. Operating system 340 either generates the user interface in response to the command or provides the user interface received to the user via display 360. The user uses keyboard/mouse 362, which is a conventional keyboard and a conventional mouse or other pointing or input device to specify the name and path of the file using conventional methods.

If the operating system 340 opens the file in response to the command, it provides a handle to the file that it opens to file handle manager 326. File handle manager 326 provides it to request manager 320, which provides it to the requesting application 310-314. If the operating system 340 provides the name and path of the file in response to the user so specifying it, the name and path is received by file handle manager 326. In such embodiment, file save as prompt initiator 324 also provides to file handle manager 326 an indication that the file is being opened for writing when it sends the command as described above. In response to the name and path, and because of the indication, file handle manager 326 builds a command to open for read and write access the file having the name and path it receives, and sends the command to operating system 340. Operating system 340 opens the file for read and write access in file storage 342 (creating the file if it does not exist), provides the handle to file handle manager 326, which provides it to request manager 320, which forwards it to the requesting application 310-314.

For either type of request, the handle to the file corresponding to the request is provided, but the name and/or path of the file is not provided to the application 310-314 by environment 300, or operating system 340 or any other entity at any time preventing the application 310-314 from accessing the file or path.

As noted above, in one embodiment, an alternate handle may be provided to the application instead of the handle to the file. In such embodiment, instead of providing the handle to the file to the requesting application as described above, file manager 326 issues an alternate handle to the handle, for example, by selecting one at random using a conventional random or pseudo-random number generator, identifying whether the alternate handle is in use by checking against a table of alternate handles in use that are stored in alternate handle storage, and if the alternate handle is in use, repeating the process until it identifies an alternate handle not already in use. When that occurs, file manager 326 stores the handle and alternate handle as an entry in a table or list of handles, alternate handles, and optionally, application identifiers, and provides the alternate handle to the requesting application. As noted above, an identifier of the application that made the request corresponding to the handle and alternate handle may also be stored on the list, in this case, by file manager 326, having received the identifier by request manager 320 and forwarded along any of the paths from request manager 320 to file manager 326 as described above.

In such embodiment, request manager 320 signals save as prompt initiator 324 or file open prompt initiator 322 as noted herein, but in addition, sends all other file access requests to subsequent request manager 330. Except as noted, subsequent request manager 330 performs the steps of FIG. 4 to execute the request, providing the request it builds with the actual handle to file handle manager 326, which forwards the request to the operating system, receives the result, and provides the result to subsequent request manager 330. Subsequent request manager 330 performs step 422 and optionally steps 424-426 and provides the results of the request, optionally with the alternate handle, to request manager 320 for forwarding to the requesting application. Subsequent request manager 330 uses, and optionally updates, the entries in the list of handles, alternate handles and optionally, application identifiers stored in alternate handle storage 328.

In one embodiment, each time an entry on the list stored in alternate handle storage 328 is stored or accessed, it is timestamped by the entity accessing it using the date and time requested from the operating system clock. A watchdog timer set by subsequent request manager 330 using the operating system may trigger a check of the list stored in alternate handle storage 328. To perform this check, subsequent request manager 330 retrieves the current date and time from the operating system and deletes the entries in the list for which the timestamp is older than a threshold amount from the date and time.

As noted herein, the handle or alternate handle is at least initially provided to the application upon the open for read or an open for write command. However, if a file opened for one purpose, for example using an open for write command, is requested to be opened for another purpose, for example, to read it, the handle or alternate handle may be used, and need not be issued. In the embodiment in which the handle is provided to the file, the application may simply reuse the handle. In the embodiment in which an alternate handle is provided, the application may reuse the alternate handle, which can be handled by the environment as if it were a subsequent request, as described above with reference to FIGS. 4 and 5 or with respect to the discussion including subsequent request manager 230 above.

What is claimed is:

1. A method of providing an application access to a file, comprising:
   receiving from the application by a program different from the application, a request to access the file, wherein the program is running on a processor coupled to a storage device;
   responsive to the request, providing a prompt, through a graphical interface, for a name and path of the file without disclosing to the application at least one selected from the name of the file and the path of the file;
   causing the file to be opened responsive to a response to the prompt, the response to the prompt being received from an input device, without disclosing to the application at least one selected from the name of the file and the path of the file; and
   providing to the application a handle to the file opened without disclosing to the application at least one selected from the name of the file and the path of the file.

2. The method of claim 1, wherein providing the handle is performed by the program different from the application.

3. The method of claim 1, wherein the name of the file and the path of the file are not, at any time, disclosed to the application.

4. The method of claim 1, wherein the application runs under the program.

5. The method of claim 4, wherein the program is different from, and runs underneath, an operating system.

6. The method of claim 5, wherein the program comprises a plug in to a browser.

7. The method of claim 1, wherein:
   the request comprises one selected from a request to read the file and a request to write to the file;
   the prompt allows selection of the name and path of the file from existing files, responsive to the request comprising a request to read the file; and
   the prompt allows selection of the name and path of the file from existing files or specifying a new name and path for the file responsive to the request comprising a request to write to the file.

8. The method of claim 1, wherein the handle is an alternate handle corresponding to a first handle of the file.

9. A system for providing an application access to a file, comprising:
   a storage device;
   a processor running a program stored on the storage device, the program comprising:
   a request manager having an input configured to receive from the application a request to access the file, the request manager configured to send, at an output, a signal responsive to the request received at the request manager input;
   a file prompt initiator having an input, coupled to the request manager output, configured to receive the signal, the file prompt initiator configured to generate and provide, via an output, a first command to provide a prompt, through a graphical interface, for a name and path of the file, the file prompt initiator not disclosing to the application at least one selected from the name of the file and the path of the file;
   a file handle manager having a first input, coupled to the file prompt initiator output, configured to receive the first command, the file handle manager being configured to:
   provide at an output at least one selected from the first command and a second command to cause the file to be opened;
   receive a handle to the file at a second input responsive to input received in response to the prompt;
   provide to the application via a second output the handle to the file;
   the file handle manager not disclosing to the application at least one selected from the name of the file and the path of the file.

10. The system of claim 9, wherein the name of the file and the path of the file are not disclosed to the application by the system.

11. The system of claim 9, wherein the application runs under a program.

12. The system of claim 11, wherein the program is different from, and runs underneath, an operating system.

13. The system of claim 12, wherein the program comprises a plug in to a browser.

14. The system of claim 9, wherein:
   the request comprises one selected from a request to read the file and a request to write to the file;
   the prompt allows selection of the name and path of the file from existing files, responsive to the request comprising a request to read the file; and
   the prompt allows selection of the name and path of the file from existing files or specifying a new name and path for the file responsive to the request comprising a request to write to the file.

15. The system of claim 9, wherein the handle is an alternate handle corresponding to a first handle of the file.

16. A computer program product comprising a storage device having computer readable program code embodied therein for providing an application access to a file, the computer program product comprising computer readable program code devices configured to cause a computer system to:
   receive from the application by a program different from the application, a request to access the file;
   responsive to the request, providing a prompt for a name and path of the file without disclosing to the application at least one selected from the name of the file and the path of the file;
   cause the file to be opened responsive to a response to the prompt, without disclosing to the application at least one selected from the name of the file and the path of the file; and provide to the application a handle to the file opened without disclosing to the application at least one selected from the name of the file and the path of the file.

17. The computer program product of claim 16, wherein the computer readable program code devices are configured to cause the computer system to provide the handle to the application from the program different from the application.

18. The computer program product of claim 16, wherein the name of the file and the path of the file are not, at any time, disclosed to the application.

19. The computer program product of claim 16, wherein the application runs under the program.

20. The computer program product of claim 19, wherein the program is different from, and runs underneath, an operating system.

21. The computer program product of claim 20, wherein the program comprises a plug in to a browser.

22. The computer program product of claim 16, wherein:
the request comprises one selected from a request to read the file and a request to write to the file;
the prompt allows selection of the name and path of the file from existing files, responsive to the request comprising a request to read the file; and
the prompt allows selection of the name and path of the file from existing files or specifying a new name and path for the file responsive to the request comprising a request to write to the file.

23. The computer program product of claim 16, wherein the handle is an alternate handle corresponding to a first handle of the file.

* * * * *

UNITED STATES PATENT AND TRADEMARK OFFICE
CERTIFICATE OF CORRECTION

PATENT NO. : 7,734,914 B2  Page 1 of 1
APPLICATION NO. : 11/219235
DATED : June 8, 2010
INVENTOR(S) : Malasky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this
Fifteenth Day of February, 2011

David J. Kappos
*Director of the United States Patent and Trademark Office*